US010899391B2

(12) United States Patent
Bokeloh et al.

(10) Patent No.: US 10,899,391 B2
(45) Date of Patent: Jan. 26, 2021

(54) FRONT-END STRUCTURE OF A MOTOR VEHICLE

(71) Applicant: Bayerische Motoren Werke Aktiengesellschaft, Munich (DE)

(72) Inventors: Jan Bokeloh, Munich (DE); Michael Floer, Munich (DE); Ralf Kiesmueller, Munich (DE); Michael Stein, Roehrmoos (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/299,499

(22) Filed: Mar. 12, 2019

(65) Prior Publication Data
US 2019/0210653 A1 Jul. 11, 2019

Related U.S. Application Data

(63) Continuation of application No. PCT/EP2017/075809, filed on Oct. 10, 2017.

(30) Foreign Application Priority Data

Oct. 21, 2016 (DE) .................. 10 2016 220 719

(51) Int. Cl.
B62D 25/02 (2006.01)
B62D 25/04 (2006.01)
B62D 25/08 (2006.01)

(52) U.S. Cl.
CPC ............. *B62D 25/02* (2013.01); *B62D 25/04* (2013.01); *B62D 25/082* (2013.01); *B62D 25/088* (2013.01)

(58) Field of Classification Search
CPC ...... B62D 25/02; B62D 25/04; B62D 25/082; B62D 25/088
(Continued)

(56) References Cited

U.S. PATENT DOCUMENTS

| 6,299,237 | B1 | 10/2001 | Benz et al. |
| 2005/0067858 | A1 | 3/2005 | Suh et al. |
| 2008/0238148 | A1* | 10/2008 | Nakamura ......... B62D 25/2018 296/203.01 |

FOREIGN PATENT DOCUMENTS

| CN | 1603195 A | 4/2005 |
| CN | 101274644 A | 10/2008 |

(Continued)

OTHER PUBLICATIONS

International Search Report (PCT/ISA/210) issued in PCT Application No. PCT/EP2017/075809 dated Dec. 8, 2017 with English translation (six (6) pages).

(Continued)

Primary Examiner — Joseph D. Pape
(74) Attorney, Agent, or Firm — Crowell & Moring LLP

(57) ABSTRACT

A motor vehicle has a bodyshell which forms a passenger cell. The bodyshell has two lateral side frames with in each case one front, lateral bodyshell pillar or A pillar. On a front side of the bodyshell, a front-end structure is formed, wherein the front-end structure has, on both sides, in each case one spring strut dome, one horizontally running support member arranged between the spring strut dome and the respective A pillar, and one support member running diagonally between the spring strut dome and a lower end of the A pillar. The two support members and the A pillar are assembled in monocoque construction from member profiles, wherein the three members form in each case one triangular load-bearing structure. The respective outwardly facing member profile of the A pillar, the respective outwardly facing member profile of the horizontally running support member and the respective outwardly facing member profile of the diagonally running support member are (Continued)

each unipartite profiles. The three profiles are connected to one another to form a triangular load-bearing structure.

8 Claims, 6 Drawing Sheets

(58) Field of Classification Search
USPC ...... 296/187.09, 187.1, 193.06, 203.01, 205, 296/203.02, 203.03
See application file for complete search history.

(56) References Cited

FOREIGN PATENT DOCUMENTS

| | | |
|---|---|---|
| DE | 101 03 252 A1 | 8/2002 |
| DE | 10 2008 015 268 A1 | 11/2008 |
| DE | 10 2010 051 785 A1 | 7/2011 |
| DE | 10 2011 111 916 A1 | 6/2012 |
| FR | 2 983 816 A1 | 6/2013 |
| JP | 4-349077 A | 12/1992 |
| JP | 2006-240588 A | 9/2006 |

OTHER PUBLICATIONS

German-language Written Opinion (PCT/ISA/237) issued in PCT Application No. PCT/EP2017/075809 dated Dec. 8, 2017 (five (5) pages).

German-language Search Report issued in counterpart German Application No. 102016220719.9 dated Jul. 14, 2017 with English translation (seven (7) pages).

English-language Chinese Office Action issued in Chinese Application No. 201780059520.1 dated Nov. 5, 2020 (Five (5) pages).

\* cited by examiner

FRONT-END STRUCTURE OF A MOTOR VEHICLE

CROSS REFERENCE TO RELATED APPLICATIONS

This application is a continuation of PCT International Application No. PCT/EP2017/075809, filed Oct. 10, 2017, which claims priority under 35 U.S.C. § 119 from German Patent Application No. 10 2016 220 719.9, filed Oct. 21, 2016, the entire disclosures of which are herein expressly incorporated by reference.

BACKGROUND AND SUMMARY OF THE INVENTION

The invention relates to a motor vehicle having a body that forms a passenger compartment, wherein the body has two lateral side frames with, in each case, one front, lateral body pillar or A-pillar.

DE 10103252 A1 discloses a motor vehicle in which, at a front end, in the region of a wheel arch on each of the two sides, a triangular load-bearing structure consists of a lateral, approximately horizontally extending supporting carrier, a diagonally extending supporting carrier connected thereto, and a lower portion of an A-pillar or front body pillar, on which the two supporting carriers are arranged.

The horizontally extending lateral supporting carrier, the obliquely extending supporting carrier connected thereto, and at least the lower portion of the front body pillar are produced from profiles in a metal monocoque construction.

The object of the invention is to create a motor vehicle in which the number of profiles for forming a respective triangular support structure between a front end and a respective A-pillar is reduced.

A motor vehicle according to the invention has a body with a passenger compartment. The body is provided with two lateral frameworks that each have a front, lateral body pillar or A-pillar. Formed at an end side of the passenger compartment is a front-end structure. The front-end structure has, on each of its two sides, a suspension-strut dome, a horizontally extending supporting carrier that is arranged between the suspension-strut dome and the respective A-pillar, and a supporting carrier extending between the suspension-strut dome and a lower end of the A-pillar. The two supporting carriers and the A-pillar are each assembled in a monocoque construction from carrier profiles. A triangular support structure is formed in each case by these three carriers.

Advantageously, the respective outwardly facing carrier profile of the A-pillar, the respective outwardly facing carrier profile of the horizontally extending supporting carrier, and the respective outwardly facing carrier profile of the diagonally extending supporting carrier are each a one-piece profile. The three profiles are connected together to form the triangular support structure.

In an advantageous embodiment, a door cutout opening adjoins the respective front, lateral body pillar. The respective door cutout opening is bounded by a further body pillar.

The respective lateral framework has advantageously at its upper end a roof lateral longitudinal member, which is connected to the respective opposite roof lateral longitudinal member via crossmembers or other components.

The vertically extending carrier profile of the A-pillar has, in one advantageous embodiment, the function of a tension/compression strip.

Advantageously, the outer, one-piece carrier profile of the horizontally extending supporting carrier forms, with an upper portion of the A-pillar, a first, upper load path, which conducts a force F, introduced via the respective suspension-strut dome, upward in the direction of the roof lateral longitudinal member of the roof of the passenger compartment.

The outer, one-piece carrier profile of the diagonally extending supporting carrier forms advantageously a second, lower load path, which conducts a force F, introduced via the respective suspension-strut dome, downward into the respective side sill.

The outer, one-piece carrier profile of the horizontally extending supporting carrier, the outer, one-piece carrier profile of the diagonally extending supporting carrier, and/or the vertically extending carrier profile of the A-pillar is/are produced from a prefabricated semifinished product with different material qualities and thicknesses.

In one advantageous embodiment, the outer, one-piece carrier profile of the horizontally extending supporting carrier, the outer, one-piece carrier profile of the diagonally extending supporting carrier, and/or the vertically extending carrier profile of the A-pillar is/are produced from a tailor blank or from a tailor rolled blank.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
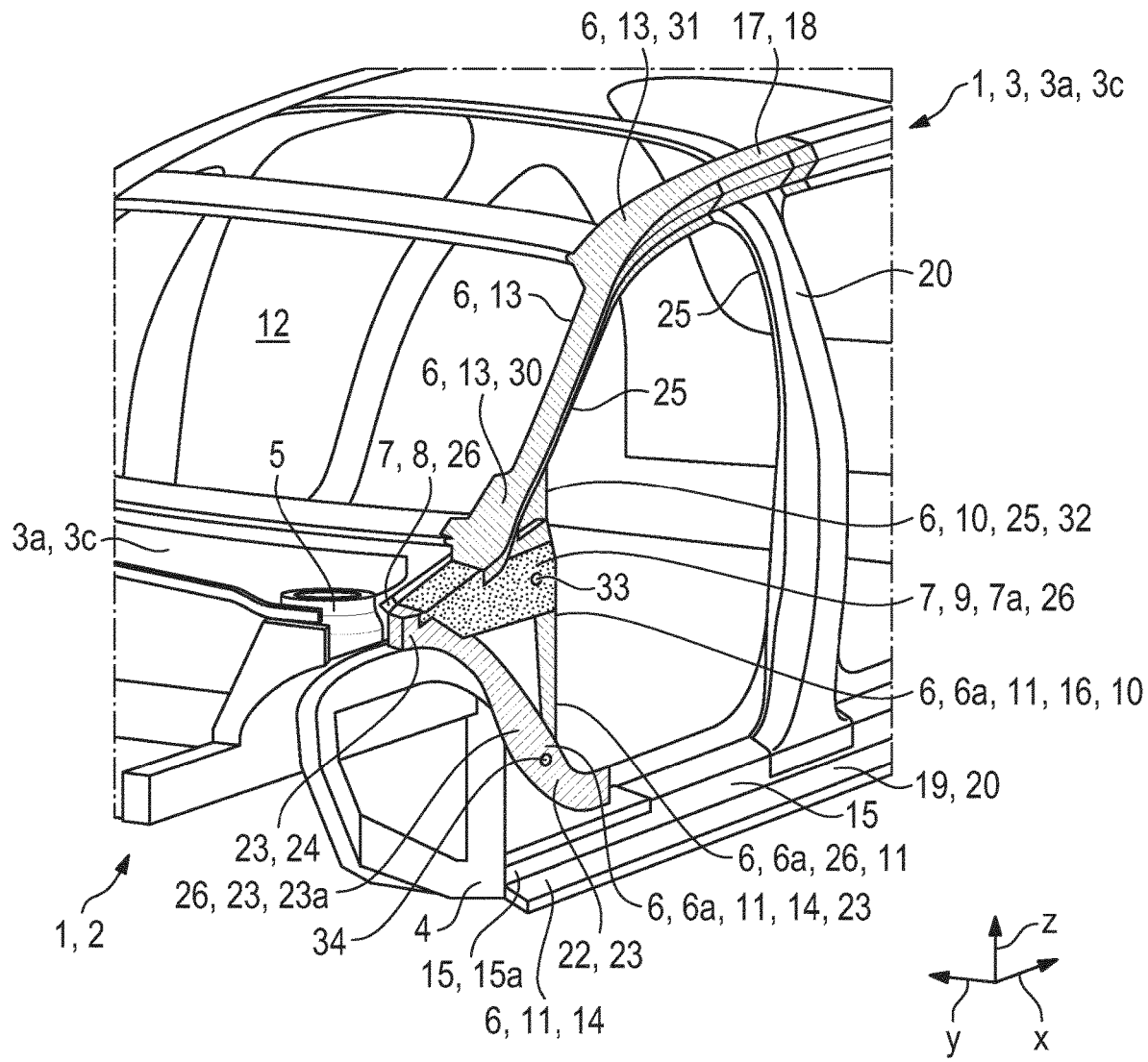
FIG. 1 is a perspective view from the side and in the direction of the vehicle rear of a partially illustrated body of a motor vehicle, showing a triangular support structure of a front end and a partially illustrated passenger compartment.

FIG. 1 shows a partially illustrated front end 2 of a motor vehicle 1, which is formed at an end side 3b of a body 3a. The front end 2 is adjoined by a partially illustrated passenger compartment 3, which is formed by the body 3a. The body 3a has two lateral frameworks 3c that each have a front, lateral body pillar or A-pillar 6.

At the level of a driver's side wheel arch 4, a lateral, approximately horizontally extending supporting carrier 7 extends on the front end 2 between a suspension-strut dome 5 and a front body pillar or A-pillar 6.

A front end 8 of the supporting carrier 7 is arranged on the suspension-strut dome 5. A rear end 9 of the approximately horizontally extending lateral supporting carrier 7 is arranged at the level of a bending region 10 of the front body pillar 6.

The bending region 10 of the front body pillar 6 is formed between an upper end 16 of the lower, approximately vertically extending portion 11 of the front body pillar 6 and a lower end 30 of an upper, oblique portion 13, extending parallel to a body opening 12 for a windshield (not illustrated), of the front body pillar 6. The upper portion 13 of the front body pillar 6 transitions at its upper end 31 into a roof lateral longitudinal member 17 of a roof 18.

A lower end 14 of the lower portion 11 of the front body pillar 6 is fastened next to a lower end 22 of a diagonally extending supporting carrier 23. The lower end 22 of the diagonally extending supporting carrier 23 is fastened next to a front end 15a of a side sill 15. Also arranged at the side sill 15 is a lower end 19 of a body B-pillar 20. An upper end 21 of the body B-pillar 20 is connected to the roof lateral longitudinal member 17.

An upper end 24 of the diagonally extending supporting carrier 23 is fastened to the front end 8 of the horizontally extending supporting carrier 7. The supporting carrier 23 extends diagonally or obliquely between the front end 8 of the horizontally extending supporting carrier 7 and the lower end 14 of the lower portion 11 of the A-pillar 6.

The horizontally extending supporting carrier 7, the diagonally extending supporting carrier 23, and the A-pillar 6 consist as a rule of several profiles that are connected together and each form a closed hollow profile.

For better force transmission and to simplify production, the outer carrier profiles 7a, 23a and 6a of the respective closed hollow profiles are produced in one piece on the respective side of the body 3a. To simplify the illustration, the respective closed hollow profiles are not illustrated, but only the outer carrier profiles 7a, 23a and 6a.

In one embodiment, an outwardly directed carrier profile 7a of the horizontally extending supporting carrier 7, a carrier profile 6a directed toward a body door cutout opening 25, and an outwardly directed carrier profile 23a of the diagonally extending supporting carrier 23 are connected together to form a triangular support structure 26. The vertically extending carrier profile 6a of the A-pillar 6 has the function of a tension/compression strip.

Figure 2:
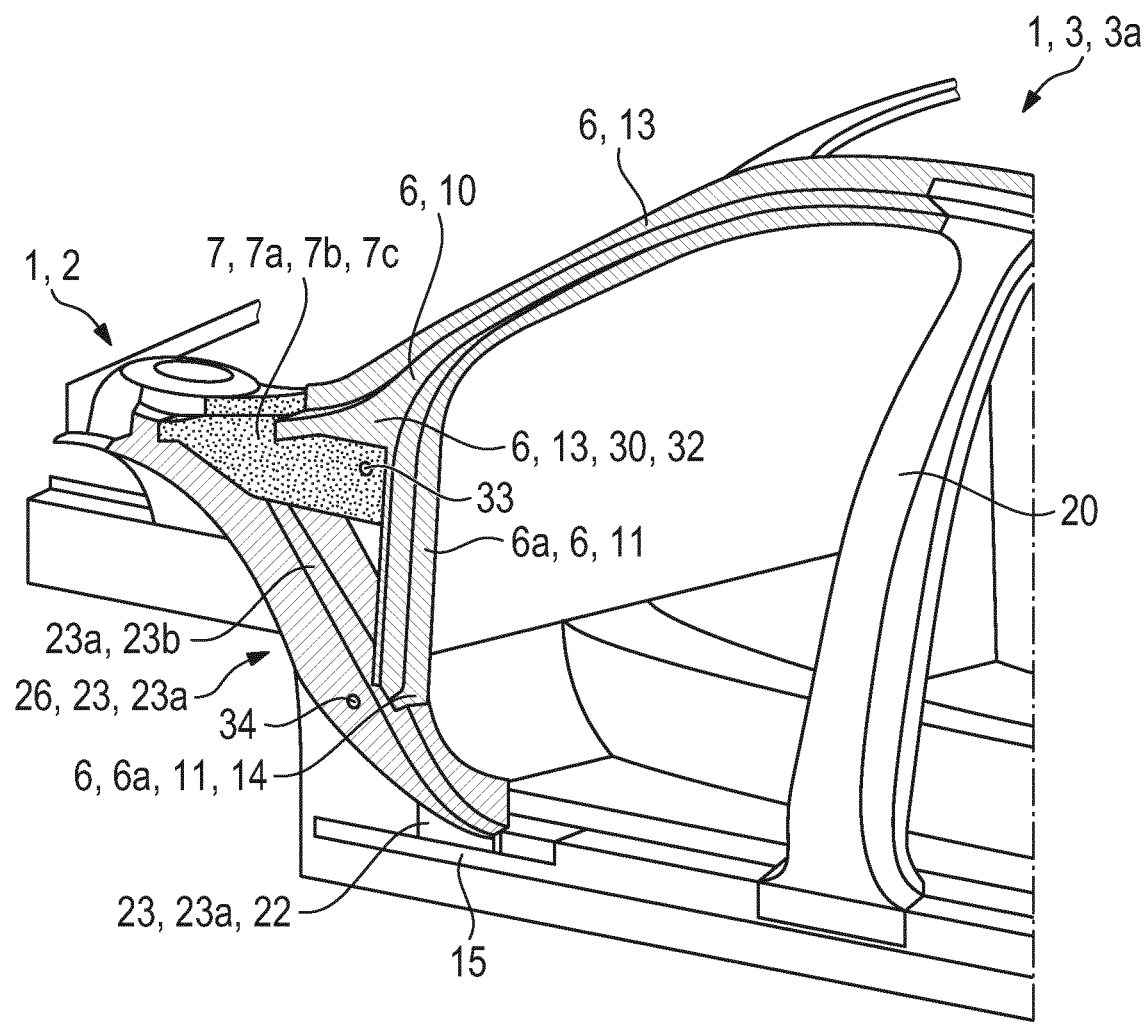
FIG. 2 is a perspective view from the side corresponding to FIG. 1 but in the direction of the front end.

FIG. 2 shows a perspective view of the triangular support structure 26 from a perspective that is directed in the direction of the front end 2. It is apparent from FIG. 2 that the carrier profiles 6a, 7a and 23a each have a three-dimensional form.

It is also apparent from FIG. 2 that the lower end 14 of the carrier profile 6a of the lower portion 11 of the A-pillar 6 is fastened to a portion 23b, extending in a vehicle transverse direction y, of the carrier profile 23a of the supporting carrier 23. Furthermore, the connection of the lower end 22 of the carrier profile 23a of the supporting carrier 23 to the side sill 15 is shown.

At the level of the bending region 10 of the A-pillar 6, a triangular profile portion 32 is formed at the lower end 30 of the upper portion 13 of the A-pillar 6. The triangular profile portion 32 is connected to an outer face 7c of a portion 7b of the carrier profile 7a of the supporting carrier 7.

Figure 3:
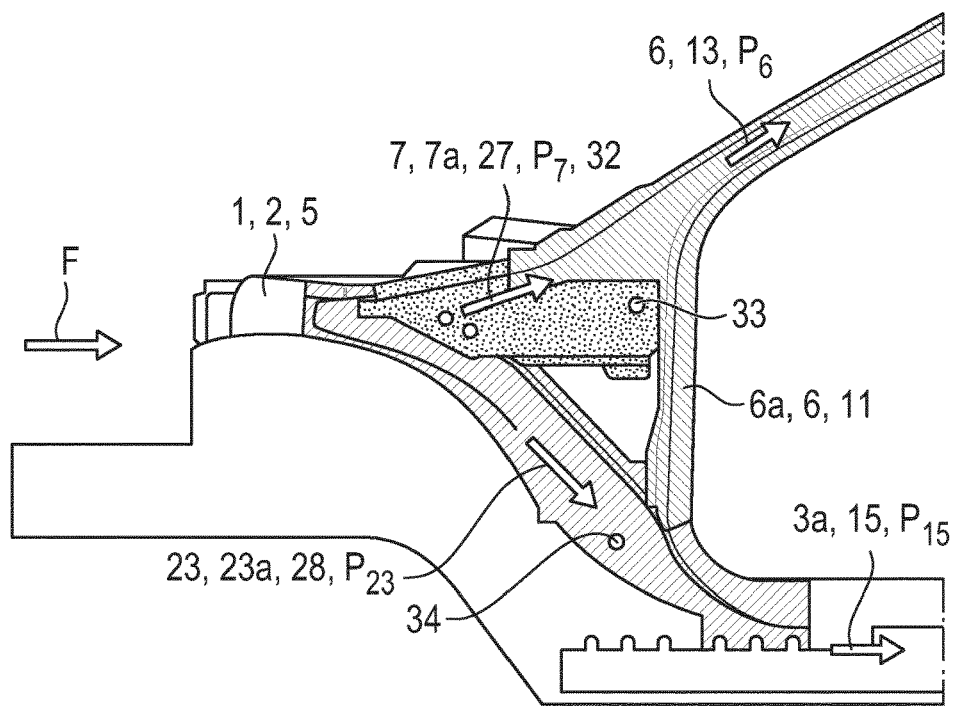
FIG. 3 is a side view of the triangular support structure shown in FIGS. 1 and 2, which shows the course of a first load path into the left-hand portion, extending obliquely upward in the direction of the roof, of the front body pillar, and the course of a second load path into a left-hand side sill of the vehicle floor.

FIG. 3 shows the two load paths extending in the triangular support structure 26. The outer, one-piece carrier profile 7a of the horizontally extending supporting carrier 7 forms, with an upper portion 13 of the A-pillar 6, a first, upper load path 27. The first, upper load path 27 conducts a F, introduced via the respective suspension-strut dome 5, upward in the direction of the roof lateral longitudinal member 17 of the roof 18 of the passenger compartment 3.

The outer, one-piece carrier profile 23a of the diagonally extending supporting carrier 23 forms a second, lower load path 28. The second, lower load path 28 conducts a F, introduced via the respective suspension-strut dome 5, downward into the respective side sill 15.

For the one part, the load or the force F applied to the front end 2 in the vehicle longitudinal direction x, for example in the event of a crash, is introduced via the first, upper load path 27 into the horizontally extending carrier profile 7a of the supporting carrier 7 as per the arrow $P_7$ and then conducted into the upper portion 13 of the A-pillar 6 as per the arrow $P_6$.

For the other part, the load or the force F applied to the front end 2 in the vehicle longitudinal direction x, for example in the event of a crash, is conducted via the second load path 28 into the carrier profile 23a of the diagonally extending supporting carrier 23 as per an arrow $P_{23}$ to the side sill 15. The force or load introduced in the side sill 15 is conducted into the body 3a of the motor vehicle 1 as per an arrow $P_{15}$.

Figure 4:
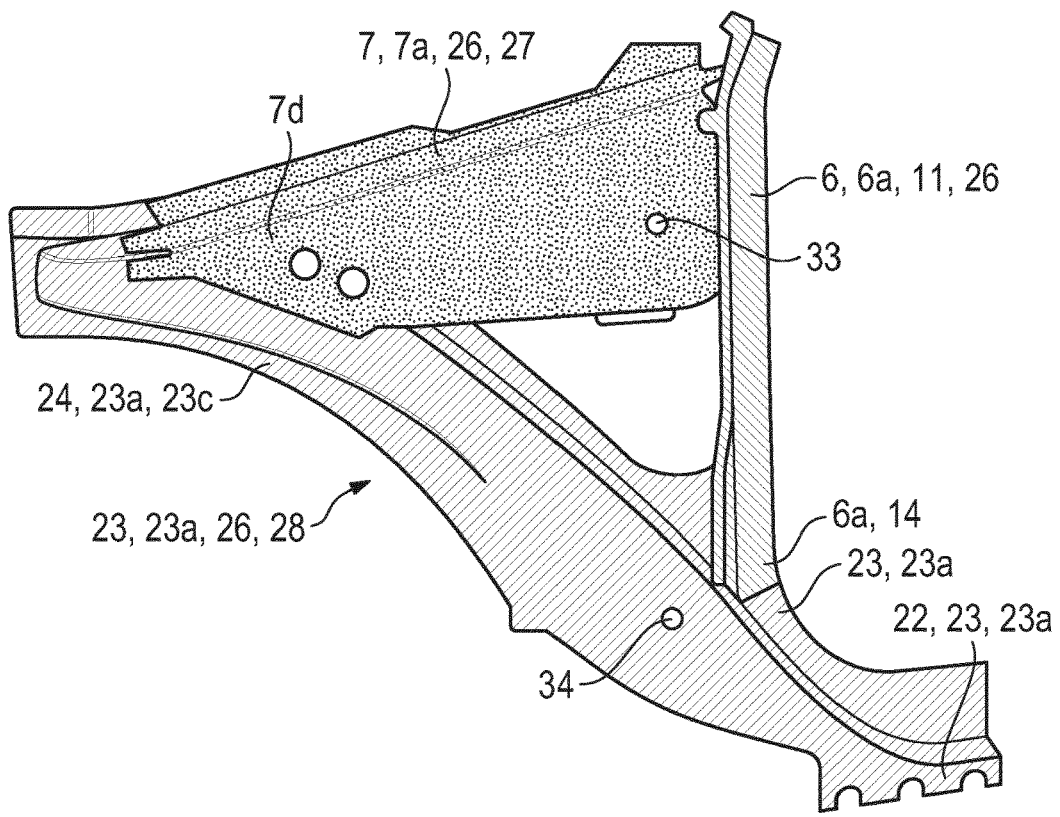
FIG. 4 is a side view of the triangular support structure shown in FIGS. 1 to 3, which is formed in a vertical plane from three individual carrier profiles, and which shows a first embodiment of a lower portion of the A-pillar.

FIG. 4 shows the triangular support structure 26 with a first embodiment of the carrier profile 6a of the A-pillar 6 at the lower portion 11 of the A-pillar. The triangular overlapping portion 32 formed in FIGS. 1, 2 and 3 is formed at a lower end 30 of the upper portion 13 of the A-pillar 6.

It is also apparent from FIG. 4 that a front portion 7d of the carrier profile 7a of the supporting carrier 7 overlaps an upper region 23c of the supporting carrier 23 at the upper end 24 of the carrier profile 23a of the supporting carrier 23 and is connected to the upper end 24 of the carrier profile 23a of the supporting carrier 23 in two planes.

Figure 5:
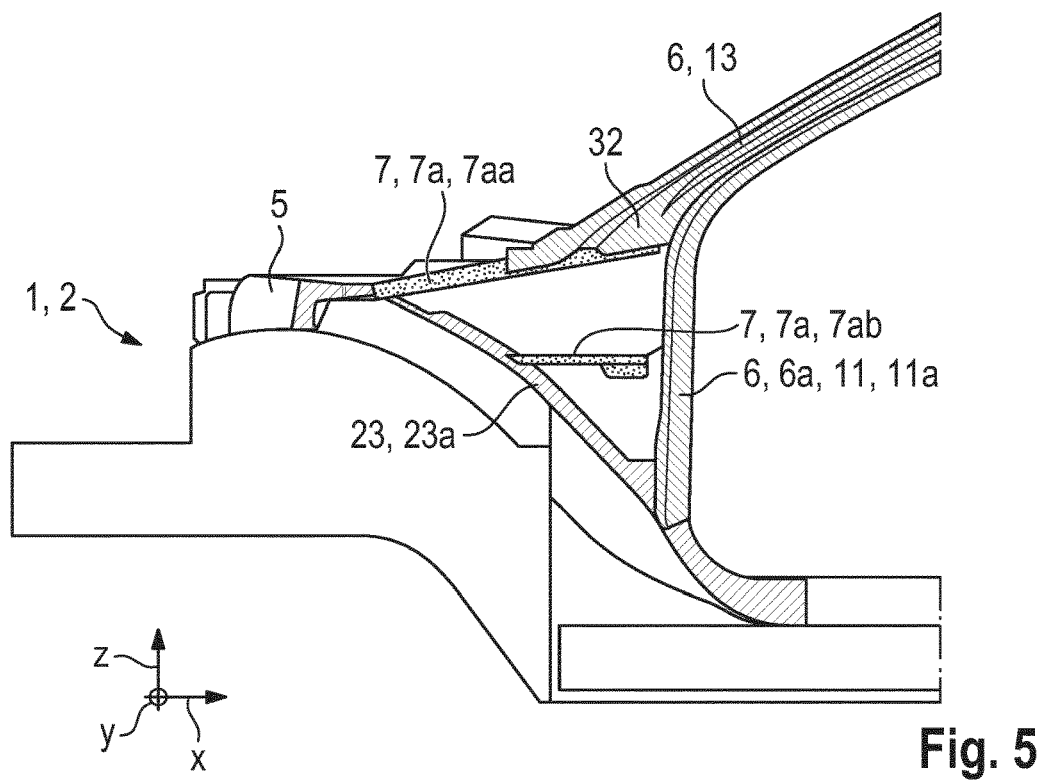
FIG. 5 is a side view of a longitudinal section of FIG. 3 in a vertical plane, wherein the section extends parallel to the longitudinal direction of the vehicle and in the direction of the vehicle middle in a manner offset in a vehicle transverse direction.

FIG. 5 shows a side view of a longitudinal section of FIG. 3, wherein the longitudinal section extends in a vertical direction. It is apparent from FIG. 5 that two webs 7aa and 7ab, extending in the vehicle longitudinal direction X, of the outer, one-piece carrier profile 7a of the horizontally extending supporting carrier 7 are arranged between the obliquely extending carrier profile 23a of the supporting carrier 23 and the opposite carrier profile 6a of the A-pillar 6.

Figure 6:
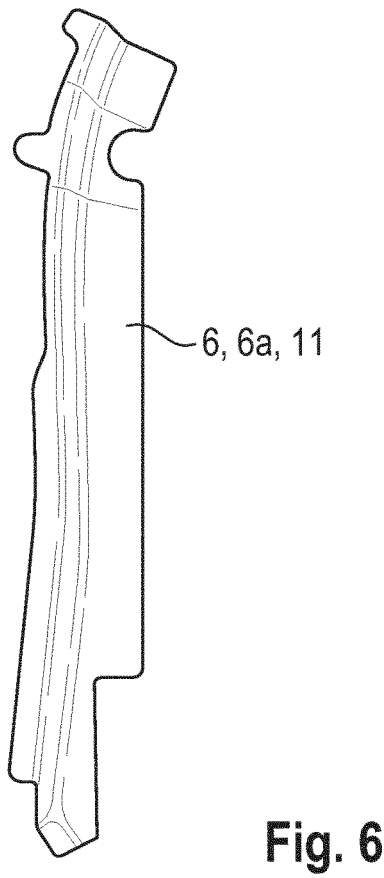
FIG. 6 is an individual view of a first embodiment of a carrier profile, shown in FIGS. 1 to 5, of the A-pillar, which is formed in the lower portion of the A-pillar.

FIG. 6 shows a side view of the first embodiment, illustrated in FIGS. 1 to 5, of the carrier profile 6a at the lower portion 11 of the A-pillar 6.

Figure 7:
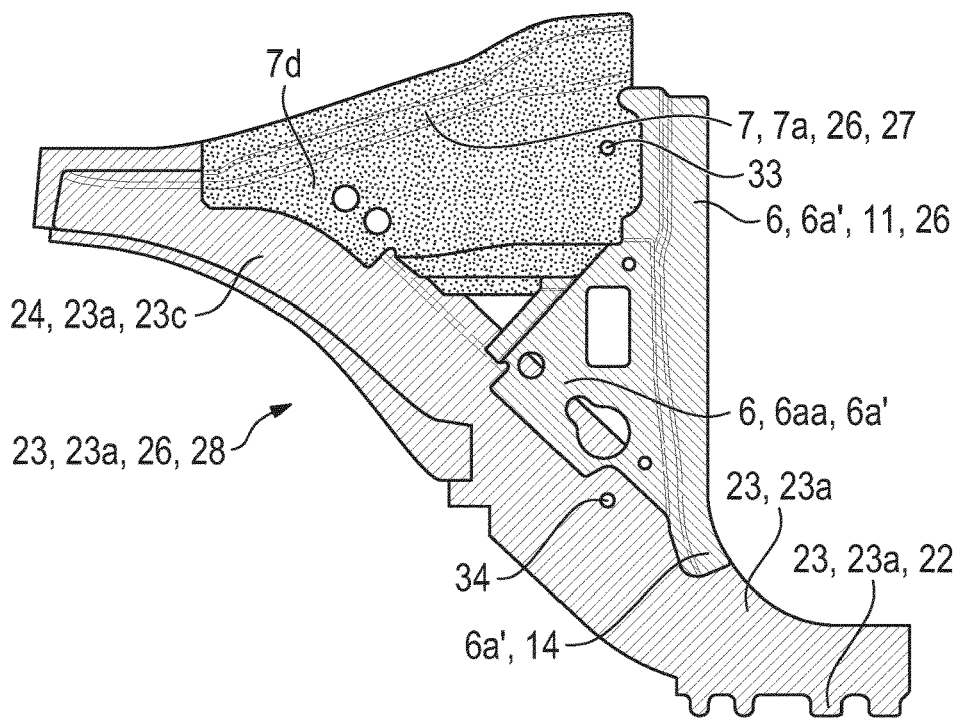
FIG. 7 is a side view corresponding to FIG. 4, which shows a second embodiment of a carrier profile of the A-pillar, which is formed in the lower portion of the A-pillar.

FIG. 7 shows a triangular support structure 26 as per FIG. 4, wherein, in FIG. 7, a second embodiment of a carrier profile 6a' is illustrated, which has a triangular additional portion 6aa.

Figure 8:
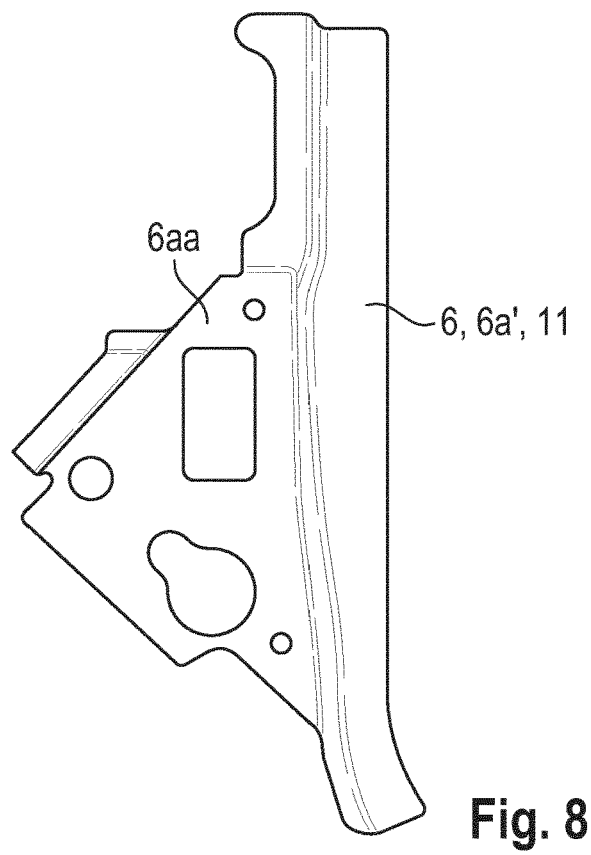
FIG. 8 is an individual view of the second embodiment of the carrier profile, shown in FIG. 7, of the A-pillar.

FIG. 8 illustrates a side view of the second embodiment, shown in FIG. 7, of the carrier profile 6a" with a rectangular additional portion 6ab.

Figure 9:
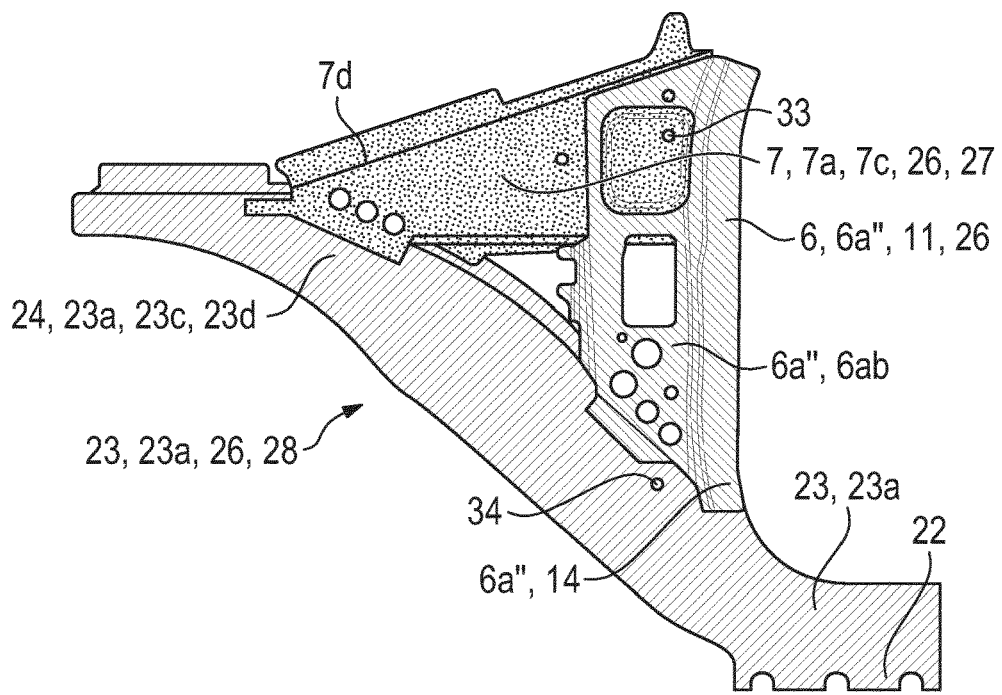
FIG. 9 is a side view corresponding to FIGS. 4 and 7, which shows a third embodiment of a carrier profile of the A-pillar, which is formed in the lower portion of the A-pillar.

FIG. 9 shows a side view of a triangular support structure 26 as per FIGS. 4 and 7, wherein FIG. 9 illustrates a third embodiment of a carrier profile 6a‴.

Figure 10:
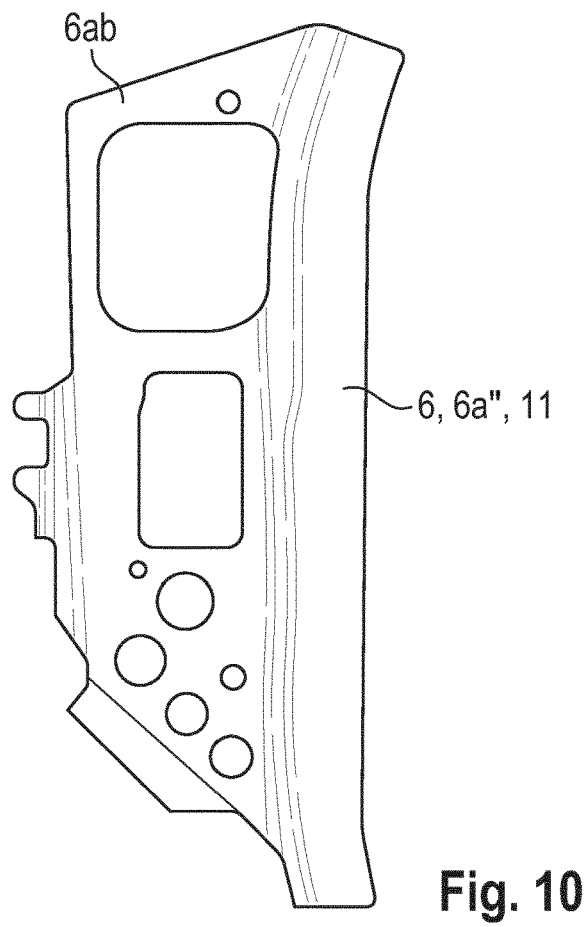
FIG. 10 is an individual view of the third embodiment of the carrier profile, shown in FIG. 9, of the A-pillar.

As is apparent from FIG. 9 and FIG. 10, the carrier profile 6a″ has a rectangular additional portion 6ab, which is connected to the outer face 7c of the carrier profile 7a of the supporting carrier 7 and to the outer face 23d of the carrier profile 23a of the supporting carrier 23.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a body forming a passenger compartment, the body having two lateral frameworks each having a front, lateral body pillar or A-pillar, comprising:
    a front-end structure arranged at one end side of the body, wherein
    the front-end structure has, on each lateral side thereof, a suspension-strut dome, a horizontally extending supporting carrier arranged between the suspension-strut dome and a respective A-pillar, and a diagonally extending supporting carrier diagonally extending between the suspension-strut dome and a lower end of the A-pillar, wherein
    the supporting carriers and the A-pillar are monocoque constructed from carrier profiles,
    a triangular support structure is formed by the horizontally extending supporting carrier, the respective A-pillar and the supporting carrier, and
    an outwardly facing carrier profile of a respective closed hollow profile of the A-pillar, an outwardly facing carrier profile of a respective closed hollow profile of the horizontally extending supporting carrier, and an outwardly facing carrier profile of a respective closed hollow profile of the diagonally extending supporting carrier diagonally extending between the suspension-strut dome and the lower end of the A-pillar are each individually a one-piece profile produced on a respective side of the body, and are connected together to form the triangular support structure.

2. The motor vehicle as claimed in claim 1, wherein
a door cutout opening adjoins the respective front, lateral A-pillar, and
the respective door cutout opening is bounded by a further body pillar.

3. The motor vehicle as claimed in claim 1, wherein
a respective lateral framework has at an upper end a roof lateral longitudinal member, which is connected to an opposite roof lateral longitudinal member via a cross-member.

4. The motor vehicle as claimed in claim 1, wherein
a vertically extending carrier profile of the A-pillar functions as a tension/compression strip.

5. The motor vehicle as claimed in claim 3, wherein
the outwardly facing, one-piece carrier profile of the horizontally extending supporting carrier forms, with an upper portion of the A-pillar, a first, upper load path, which conducts a force, introduced via the respective suspension-strut dome, upward in a direction of the roof lateral longitudinal member of a roof of the body.

6. The motor vehicle as claimed in claim 5, wherein
the outwardly facing, one-piece carrier profile of the diagonally extending supporting carrier forms a second, lower load path, which conducts a force, introduced via the respective suspension-strut dome, downward into a respective side sill.

7. The motor vehicle as claimed in claim 1, wherein
the outwardly facing, one-piece carrier profile of the horizontally extending supporting carrier, the outwardly facing, one-piece carrier profile of the diagonally extending supporting carrier, and/or a vertically extending carrier profile of the A-pillar are produced from a prefabricated semifinished product with different material qualities and thicknesses.

8. The motor vehicle as claimed in claim 7, wherein
the outwardly facing, one-piece carrier profile of the horizontally extending supporting carrier, the outwardly facing, one-piece carrier profile of the diagonally extending supporting carrier, and/or the vertically extending carrier profile of the A-pillar are produced from a tailor blank or from a tailor rolled blank.

* * * * *